US012540310B2

(12) United States Patent
Hong et al.

(10) Patent No.: US 12,540,310 B2
(45) Date of Patent: Feb. 3, 2026

(54) DIFFERENTIATION METHOD OF NEURAL STEM CELLS MANUFACTURED BY DIRECT CELL CONVERSION INTO ASTROCYTES

(71) Applicant: Korea University Research and Business Foundation, Seoul (KR)

(72) Inventors: Sung Hoi Hong, Seoul (KR); Ahyoung Jang, Yongin-si (KR); Kyung-Ah Choi, Cheorwon-gun (KR)

(73) Assignee: Korea University Research and Business Foundation, Seoul (KR)

( * ) Notice: Subject to any disclaimer, the term of this patent is extended or adjusted under 35 U.S.C. 154(b) by 835 days.

(21) Appl. No.: 17/425,189

(22) PCT Filed: Jan. 20, 2020

(86) PCT No.: PCT/KR2020/000948
§ 371 (c)(1),
(2) Date: Jul. 22, 2021

(87) PCT Pub. No.: WO2020/153687
PCT Pub. Date: Jul. 30, 2020

(65) Prior Publication Data
US 2022/0119765 A1    Apr. 21, 2022

(30) Foreign Application Priority Data
Jan. 22, 2019    (KR) ........................ 10-2019-0008256

(51) Int. Cl.
*C12N 5/079*    (2010.01)
(52) U.S. Cl.
CPC ...... *C12N 5/0622* (2013.01); *C12N 2501/115* (2013.01); *C12N 2501/13* (2013.01); *C12N 2501/155* (2013.01)
(58) Field of Classification Search
None
See application file for complete search history.

(56) References Cited

U.S. PATENT DOCUMENTS

| 2003/0036195 | A1  |  2/2003 | Studer et al. |          |
|--------------|-----|---------|---------------|----------|
| 2005/0176141 | A1  |  8/2005 | Vanguri et al.|          |
| 2015/0353888 | A1  | 12/2015 | Inoue et al.  |          |
| 2017/0267971 | A1* |  9/2017 | Han ........... | C12N 5/0622 |
| 2018/0228845 | A1* |  8/2018 | Kim ........... | A61K 38/19 |
| 2018/0306780 | A1  | 10/2018 | Muotri et al. |          |
| 2019/0194612 | A1* |  6/2019 | Lee ........... | C12N 5/0622 |

FOREIGN PATENT DOCUMENTS

| CN | 1549856       | A |    11/2004 |           |
|----|---------------|---|------------|-----------|
| CN | 104962519     | A |    10/2015 |           |
| CN | 107454913     | A |    12/2017 |           |
| JP | 2006-521807   | A |     9/2006 |           |
| JP | 2007-522796   | A |     8/2007 |           |
| JP | 2010-531663   | A |     9/2010 |           |
| JP | 2013-17434    | A |     1/2013 |           |
| KR | 2003-0032953  | A |     4/2003 |           |
| KR | 10-2013-0093890 | A |   8/2013 |           |
| KR | 10-2015-0042670 | A |   4/2015 |           |
| KR | 20150042670   | A | * 4/2015 | ........... C12N 5/0619 |
| KR | 10-2016-0024126 | A |   3/2016 |           |
| KR | 10-1636966    | B1|     7/2016 |           |
| KR | 10-2275631    | B1|     7/2021 |           |
| WO | 2005/081857   | A2|     9/2005 |           |
| WO | 2009/157559   | A1|    12/2009 |           |
| WO | 2012/135621   | A2|    10/2012 |           |
| WO | 2014/104409   | A1|     7/2014 |           |
| WO | 2017/172976   | A1|    10/2017 |           |

OTHER PUBLICATIONS

Magistri et al (European Journal of Neuroscience, vol. 44, pp. 2858-2870, 2016, doi:10.1111/ejn.13382) (Year: 2016).*
Chandrasekaran et al (Front. Cell. Neurosci. 10:215., doi: 10.3389/fncel.2016.00215, Published: Sep. 26, 2016) (Year: 2016).*
Weible et al (GLIA 55:1156-1168 (2007), DOI 10.1002/glia.20539) (Year: 2007).*
Abinaya Chandrasekaran, et al., "Astrocyte Differentiation of Human Pluripotent Stem Cells: New Tools for Neurological Disorder Research", Frontiers in Cellular Neuroscience, Sep. 26, 2016, pp. 1-27, vol. 10, article 215.
International Search Report for PCT/KR2020/000948 dated May 1, 2020 [PCT/ISA/210].
Written Opinion for PCT/KR2020/000948 dated May 1, 2020 [PCT/ISA/237].
Grant of Patent for counterpart KR Application No. 10-2020-0007878 dated May 27, 2021.
Michael A. Bonaguidi et al., "LIF and BMP signaling generate separate and discrete types of GFAP-expressing cells", Development, vol. 132, No. 24, pp. 5503-5514 (12 pages total).
Communication dated Aug. 23, 2022 from the Japanese Patent Office in Application No. 2021-542414.
Chinese Search Report issued Jul. 15, 2023 in Application No. 202080014583.7.

(Continued)

*Primary Examiner* — Peter Paras, Jr.
*Assistant Examiner* — Khoa Nhat Tran
(74) *Attorney, Agent, or Firm* — Sughrue Mion, PLLC (57) ABSTRACT

The present invention relates to a method for efficiently differentiating neural stem cells into astrocytes and, more particularly, to a cell conversion-based method for more efficiently differentiating human neural stem cells into astrocytes that exhibit immune response suppression ability within a short period of time. Unlike a conventional method, the method for differentiating neural stem cells into astrocytes by using a differentiation medium containing a combination of several cytokines, according to the present invention, involves a shortened differentiation time and has excellent differentiation efficiency, and the differentiated astrocytes exhibit immune response suppression ability, and thus can be useful as an agent for treating various brain diseases such as degenerative neurological diseases.

14 Claims, 10 Drawing Sheets

(56) References Cited

OTHER PUBLICATIONS

Chinese Office Action issued Jul. 15, 2023 in Application No. 202080014583.7.
Office Action of Chinese Application No. 202080014583.7 issued on Sep. 5, 2024 from Chinese Patent Office.

\* cited by examiner

DIFFERENTIATION METHOD OF NEURAL STEM CELLS MANUFACTURED BY DIRECT CELL CONVERSION INTO ASTROCYTES

CROSS REFERENCE TO RELATED APPLICATIONS

This application is a National Stage of International Application No. PCT/KR2020/000948 filed Jan. 20, 2020, claiming priority based on Korean Patent Application No. 10-2019-0008256 filed Jan. 22, 2019, the entire disclosures of which are incorporated herein by reference.

TECHNICAL FIELD

The present invention relates to a method of efficiently differentiating neural stem cells into astrocytes, and more particularly to a method for more efficiently differentiating human neural stem cells into astrocytes that exhibit immune response suppression ability within a short period of time based on cell conversion.

BACKGROUND ART

Methods that can treat diseases caused by neuronal cell death such as neurodegenerative diseases (such as Huntington's disease, Parkinson's disease, and Alzheimer's disease), have been actively studied around the world for a long time. Representatively, research is being conducted to develop a method of differentiating stem cells into neurons to replace damaged neurons. This method is not widely used due to the difficulty differentiating stem cells into desired cells due to the inherent characteristics of stem cells. No innovative method has not yet been developed.

Most neurodegenerative diseases are mainly caused by dysfunction or loss of nerve cells (neurons). However, recent studies have shown that Huntington's disease and Parkinson's disease are greatly affected not only by neurons but also by astrocytes located in the vicinity thereof, and thus interest in astrocytes has rapidly increased.

Astrocytes, which are a type of neuron, are known to occupy the largest part (about 40% or more) of the nervous system and to play various important roles in the central nervous system. Astrocytes are known to support neuronal activity by appropriately removing neurotransmitters secreted by neurons or regulating the concentration of ions in the brain, and to be involved in formation of neuron synapses or formation or maintenance of the blood-brain barrier. In addition, when the brain is damaged, astrocytes are converted into reactive astrocytes that protect other neurons and act as immune cells.

Most methods of differentiating stem cells into astrocytes that have been used to date use a technique of differentiating embryonic stem cells or induced pluripotent stem cells into astrocytes (Korean Patent No. 10-1793722, Korean Patent No. 10-1636966). Human embryonic stem cells entail ethical problems due to the use of human embryos, immune rejection problems, and the formation of teratomas. The use of induced pluripotent stem cells is free from ethical issues, but is problematic in that the implant of undifferentiated stem cells may cause the formation of teratomas and the introduction of foreign genes may cause mutations. Meanwhile, direct conversion (transdifferentiation) can be satisfactorily used as a cell therapy because it can induce differentiation of a subject's fibroblasts into neural stem cells, thus avoiding both the risk of immune rejection and ethical problems. Thus, the present inventors used neural stem cells constructed through direct conversion (transdifferentiation) using small molecule compounds for the differentiation of astrocytes.

Since astrocytes differentiated by the conventional method contain other cells in addition to pure astrocytes, there are problems of low astrocyte differentiation efficiency and purity (Korea Patent Publication No. 10-2014-0071512). In addition, conventional methods take a long differentiation time of 180 days or more and have low efficiency. Differentiation using other cytokines or small molecule compounds is being researched as a solution to these problems with the conventional methods, but a definite differentiation method has not yet been established.

Accordingly, as a result of intensive efforts to differentiate neural stem cells produced through direct conversion (transdifferentiation) into astrocytes having excellent efficacy for treating neurological diseases, the present inventors found that when differentiating neural stem cells into astrocytes using a medium containing a combination of the cytokines ciliary neurotrophic factor (CNTF), basic fibroblast growth factor (bFGF), and bone morphogenetic protein 4 (BMP4), unlike conventional methods, the differentiation time is shortened, the differentiation efficiency is excellent, and the differentiated astrocytes exhibited immune response suppression ability, and completed the present invention based thereon.

SUMMARY OF THE INVENTION

An object of the present invention is to provide a method of differentiating neural stem cells into astrocytes having the ability to suppress an immune response using a differentiation medium containing a combination of the cytokines CNTF (ciliary neurotrophic factor), bFGF (basic fibroblast growth factor) and BMP4 (bone morphogenetic protein 4) to efficiently differentiate neural stem cells into astrocytes.

Another object of the present invention is to provide a composition for treating inflammatory diseases or degenerative brain diseases containing, as an active ingredient, astrocytes that are differentiated by the method and can be used to suppress the immune response occurring in various brain diseases, or a culture medium (conditioned medium) obtained during the differentiation process.

To achieve the above objects, the present invention provides a method for differentiating neural stem cells into astrocytes including (a) primarily culturing neural stem cells in a differentiation medium containing CNTF (ciliary neurotrophic factor), bFGF (basic fibroblast growth factor) and BMP4 (bone morphogenetic protein 4), (b) secondarily culturing the primarily cultured cells in a differentiation medium not containing bFGF (basic fibroblast growth factor) but containing CNTF (ciliary neurotrophic factor) and BMP4 (bone morphogenetic protein 4), and (c) tertiarily culturing the secondarily cultured cells in a differentiation medium not containing CNTF (ciliary neurotrophic factor), bFGF (basic fibroblast growth factor) and BMP4 (bone morphogenetic protein 4), but containing FBS (fetal bovine serum).

The present invention also provides a composition for preventing or treating inflammatory diseases containing as an active ingredient the culture medium obtained by the method of differentiating neural stem cells into astrocytes.

The present invention also provides a method for preventing or treating inflammatory diseases including administering to a subject a composition containing as an active ingredient the culture medium obtained by the method of differentiating neural stem cells into astrocytes.

The present invention also provides the use of the composition containing as an active ingredient the culture medium obtained by the method of differentiating neural stem cells into astrocytes for the prevention or treatment of inflammatory diseases.

The present invention also provides the use of the composition containing as an active ingredient the culture medium obtained by the method of differentiating neural stem cells into astrocytes for the preparation of a medicament for preventing or treating inflammatory diseases.

DETAILED DESCRIPTION AND PREFERRED EMBODIMENTS OF THE INVENTION

Unless defined otherwise, all technical and scientific terms used herein have the same meanings as those appreciated by those skilled in the field to which the present invention pertains. In general, the nomenclature used herein is well-known in the art and is ordinarily used.

In the present invention, human neural stem cells are rapidly and efficiently differentiated into astrocytes through serial culture using a combination of the cytokines ciliary neurotrophic factor (CNTF), basic fibroblast growth factor (bFGF), and bone morphogenetic protein 4 (BMP4). The differentiated astrocytes are mature astrocytes that have ion channels and are capable of conducting glutamate uptake, and the expression of TNF-α, which is an inflammation-inducing factor, is reduced in the astrocytes. Therefore, the astrocytes differentiated by the method of the present invention have the ability to suppress immune responses and thus can be used for the treatment or alleviation of various brain diseases such as degenerative neurological diseases. In addition, the conditioned medium obtained through the differentiation process was found to have the effect of alleviating the inflammation of inflammation-induced cells.

Therefore, in one aspect, the present invention is directed to a method for differentiating neural stem cells into astrocytes including (a) primarily culturing neural stem cells in a differentiation medium containing CNTF (ciliary neurotrophic factor), bFGF (basic fibroblast growth factor), and BMP4 (bone morphogenetic protein 4), (b) secondarily culturing the primarily cultured cells in a differentiation medium not containing bFGF (basic fibroblast growth factor) but containing CNTF (ciliary neurotrophic factor) and BMP4 (bone morphogenetic protein 4), and (c) tertiarily culturing the secondarily cultured cells in a differentiation medium not containing CNTF (ciliary neurotrophic factor), bFGF (basic fibroblast growth factor) and BMP4 (bone morphogenetic protein 4), but containing FBS (fetal bovine serum).

In one embodiment of the present invention, after human neural stem cells are cultured in a basic neurobasal medium, the attached cells are removed and suspension-cultured again to form spheres.

The basic neurobasal medium is preferably DMEM/F12 containing N2, B27, bFGF and EGF, but is not limited thereto.

In the present invention, human neurons may be used as starting neurons. Induced neural stem cells used for the treatment of diseases are preferably somatic cells isolated from a patient, for example, somatic cells involved in the disease or somatic cells involved in therapy of the disease. The somatic cells are preferably fibroblasts, but are not limited thereto.

The neural stem cells of the present invention are preferably cell conversion-based human neural stem cells produced from human somatic cells through a direct conversion method, but are not limited thereto.

In the present invention, the neural stem cells differentiated into astrocytes may have a sphere shape.

In one embodiment of the present invention, the adherent-cultured human neural stem cells are removed and cultured in a suspension to form spheres, and the formation of the spheres is preferably performed for 4 to 9 days, but is not limited thereto.

The formed spheres are placed on a plate coated with PLO/FN for differentiation into astrocytes, and the medium is then replaced with an astrocyte differentiation medium the next day.

In the present invention, the astrocyte differentiation medium is preferably DMEM/F12 containing N2 and B27, but is not limited thereto.

In the present invention, the culture in step (a) is preferably performed for 2 days in an astrocyte differentiation medium containing the cytokines CNTF (ciliary neurotrophic factor), bFGF (basic fibroblast growth factor), and BMP4 (bone morphogenetic protein 4), but is not limited thereto.

In addition, the cultivation in step (b) is preferably performed for 2 days in an astrocyte differentiation medium containing only CNTF (ciliary neurotrophic factor) and BMP4 (bone morphogenetic protein 4) cytokines, while excluding bFGF (basic fibroblast growth factor), but is not limited thereto.

Next, the culture in step (c) is preferably performed for 21 to 35 days in a differentiation medium containing only FBS (fetal bovine serum), while excluding the cytokines CNTF (ciliary neurotrophic factor), bFGF (basic fibroblast growth factor) and BMP4 (bone morphogenetic protein 4), but is not limited thereto.

In the present invention, the FBS is preferably 1.5% to 4.5% (v/v), but is not limited thereto.

In the present invention, the differentiated astrocytes may express a GFAP or S100β marker.

The GFAP (glial fibrillary acidic protein) and S100β (S100 calcium-binding protein β) marker genes are astrocyte markers, and the expression levels thereof gradually increase as differentiation into astrocytes proceeds.

In one embodiment of the present invention, the expression levels of GFAP and S100β were analyzed for each differentiation cycle through immunocytochemistry, and the result of analysis showed that differentiation efficiency increased from 53.94% on DD26 to 94.33% on DD33.

In addition, in an embodiment of the present invention, the astrocyte marker GFAP (glial fibrillary acidic protein) was identified through differentiation into astrocytes using a conventional differentiation method (Zhou et al., Stem cell international, 2016) and the method of the present invention. The result showed that the GFAP signal was expressed more strongly in the cells differentiated in the differentiation medium of the present invention, but was expressed very weakly in the cells differentiated in the differentiation medium of the conventional method. Specifically, with regard to differentiation efficiency, the conventional method had a differentiation efficiency of 34.35%, whereas the method using the differentiation medium of the present invention exhibited a very high differentiation efficiency of 94.33%.

In the present invention, the differentiated astrocytes may express Aquaporin 4 (AQP4), Kir4.1 or Twik-1 markers.

The Aquaporin 4 (AQP4), Kir4.1, and Twik-1 markers are ion channel markers present in astrocytes, and the maturation of differentiated astrocytes can be determined by detecting the presence or absence of ion channels located in the astrocyte membrane.

In order for the differentiated astrocytes of the present invention to properly perform the main functions thereof, such as supporting the maintenance of neuron functions, maturation of astrocytes is important. In addition, mature astrocytes should perform well the glutamate uptake function, that is, the function of removing glutamate released by neurons.

In the present invention, the astrocytes may perform glutamate uptake.

Therefore, it can be seen that the astrocytes differentiated by the method of the present invention are mature astrocytes.

In one embodiment of the present invention, it can be seen that the differentiated astrocytes of the present invention reduced the expression of TNF-α, which is an inflammation-inducing factor, and it can be demonstrated that the differentiated astrocytes have a function of inhibiting inflammatory reactions. In addition, when keratinocytes, inflamed through treatment with INF-γ and TNF-α, are treated with the culture medium collected during differentiation of human neural stem cells into astrocytes, TNF-α expression was decreased compared to the control not treated with the culture medium, the inflammatory response was alleviated, and the expression of pro-inflammatory cytokines IL-1β and p-NF-kB was also decreased in the cell group treated with the culture medium.

In another embodiment of the present invention, when cells, in which an inflammatory reaction is induced by treating macrophages, which are cells responsible for immunity, with LPS, were treated with the culture medium collected during differentiation of human neural stem cells into astrocytes, the cells were activated in the group treated with only LPS, whereas the cells had morphology similar to that of normal cells, and IL-6 expression and MCP-1 expression were decreased in the group treated with the culture medium, which indicates that the human neural stem cell-derived astrocyte culture medium functions to alleviate the inflammatory response in inflammation-induced cells.

In another aspect, the present invention is directed to a composition for preventing, alleviating or treating inflammatory diseases containing as an active ingredient a culture medium obtained by a method for differentiating neural stem cells into astrocytes including (a) primarily culturing neural stem cells in a differentiation medium containing CNTF (ciliary neurotrophic factor), bFGF (basic fibroblast growth factor) and BMP4 (bone morphogenetic protein 4), (b)

secondarily culturing the primarily cultured cells in a differentiation medium not containing bFGF (basic fibroblast growth factor) but containing CNTF (ciliary neurotrophic factor) and BMP4 (bone morphogenetic protein 4), and (c) tertiarily culturing the secondarily cultured cells in a differentiation medium not containing CNTF (ciliary neurotrophic factor), bFGF (basic fibroblast growth factor) and BMP4 (bone morphogenetic protein 4), but containing FBS (fetal bovine serum).

In the present invention, the culture medium may be a conditioned medium from which cells have been removed.

The expression of TNF-α is reduced in the differentiated astrocytes of the present invention, and the conditioned medium obtained during the differentiation process also inhibits the inflammatory response.

As used herein, the term "prevention" means any action of preventing the onset of a disease or inhibiting progression thereof by administration of the pharmaceutical composition of the present invention.

As used herein, the term "alleviation" means any action that at least reduces the severity of a parameter related to the condition in need of treatment, for example, the degree of a symptom.

As used herein, the term "treatment" refers to any action to alleviate or beneficially change the symptoms of a disease by administration of the pharmaceutical composition of the present invention.

In another aspect, the present invention is directed to a method for preventing or treating inflammatory diseases including administering to a subject a composition containing as an active ingredient the culture medium obtained by the method of differentiating neural stem cells into astrocytes.

In another aspect, the present invention is directed to the use of the composition containing as an active ingredient the culture medium obtained by the method of differentiating neural stem cells into astrocytes for the prevention or treatment of inflammatory diseases.

In the present invention, the culture medium may be a conditioned medium from which cells have been removed.

In another aspect, the present invention is directed to the use of the composition containing as an active ingredient the culture medium obtained by the method of differentiating neural stem cells into astrocytes for the preparation of a medicament for preventing or treating inflammatory diseases.

In the present invention, the culture medium may be a conditioned medium from which cells have been removed.

As used herein, the term "subject" refers to any animal, including a human, that suffers from or is at risk of developing a disease, and the disease can be effectively prevented or treated by administering the composition according to the present invention to the subject.

As used herein, the term "administration" refers to an action of introducing the pharmaceutical composition according to the present invention into a subject by any appropriate method, and the route of administration of the composition may be any general route, so long as it enables the composition to be delivered to target tissue.

The route of administration of the pharmaceutical composition of the present invention may be administered through any general route, as long as the pharmaceutical composition is capable of reaching the target tissue. The pharmaceutical composition of the present invention may be administered intraperitoneally, intravenously, intramuscularly, subcutaneously, intradermally, orally, intranasally, pulmonarily, or rectally as desired, but is not particularly limited thereto. In addition, the composition may be administered by any device capable of delivering the active substance to the target cell.

The pharmaceutical composition of the present invention may be administered in a pharmaceutically effective amount. The term "pharmaceutically effective amount" as used herein refers to an amount which is sufficient for treating or preventing a disease at a reasonable benefit/risk ratio applicable to all medical treatment or prevention. The effective dose may be changed depending on a variety of factors including the severity of the disease to be treated, drug activity, the age, weight, health, and gender of the patient, the sensitivity of the patient to drugs, the administration time, administration route and excretion rate of the composition used according to the present invention, drugs used in combination or conjunction with the composition of the present invention, and other factors well known in the medical field.

The pharmaceutical composition of the present invention may be administered as a single therapeutic agent or in combination with other therapeutic agents. In this case, the composition of the present invention may be administered sequentially or simultaneously with conventional therapeutic agents. In addition, the composition may be administered in a single dose or multiple doses. It is important to administer a minimal amount sufficient to achieve maximum efficacy without side effects in consideration of these factors.

In addition, the dosage of the pharmaceutical composition according to the present invention may be determined by those skilled in the art in consideration of the purpose of use, the severity of the disease, the patient's age, weight, gender and history, the types of substances used as active ingredients and the like. For example, the pharmaceutical composition of the present invention may be administered to an mammal including a human in a daily dose of 10 mg/kg to 100 mg/kg, more preferably 10 mg/kg to 30 mg/kg. The frequency of administration of the composition of the present invention is not particularly limited, and the composition may be administered one to three times a day, or may be divided into multiple doses and administered throughout the day.

The pharmaceutical composition of the present invention may be prepared in the form of a pharmaceutical composition for treating or preventing inflammatory diseases, which further contains an appropriate carrier, excipient or diluent commonly used in the preparation of pharmaceutical compositions, and the carrier may include a non-naturally occurring carrier.

Specifically, the pharmaceutical composition may be formulated as an oral formulation, such as a powder, granule, tablet, capsule, suspension, emulsion, syrup, or aerosol, an external preparation, a suppository, or a sterile injectable solution according to a conventional method.

Examples of the carrier, excipient or diluent included in the pharmaceutical composition according to the present invention include lactose, dextrose, sucrose, sorbitol, mannitol, xylitol, erythritol, maltitol, starch, acacia rubber, alginate, gelatin, calcium phosphate, calcium silicate, cellulose, methyl cellulose, microcrystalline cellulose, polyvinyl pyrrolidone, water, methylhydroxybenzoate, propylhydroxybenzoate, talc, magnesium stearate, mineral oil, and the like. In the case of a formulation, the pharmaceutical composition may be prepared using a diluent or excipient such as a commonly used filler, extender, binder, wetting agent, disintegrant, or surfactant.

Solid formulations for oral administration may include tablets, pills, powders, granules, capsules and the like, and may be prepared by mixing at least one excipient, for example, starch, calcium carbonate, sucrose, lactose, gelatin, or the like. In addition to simple excipients, lubricants such as magnesium stearate and talc are also used.

Liquid formulations for oral administration may be suspensions, oral liquids and solutions, emulsions, syrups and the like, and may contain various excipients, such as wetting agents, sweeteners, fragrances, preservatives, and the like, in addition to water and liquid paraffin, which are simple diluents that are commonly used. Formulations for parenteral administration may include sterilized aqueous solutions, non-aqueous solvents, suspensions, emulsions, freeze-dried preparations, and suppositories. Non-aqueous solvents and suspensions include propylene glycol, polyethylene glycol, vegetable oil such as olive oil, injectable esters such as ethyl oleate, and the like.

The pharmaceutical composition may be a sterile injectable formulation such as a sterile injectable aqueous or oily suspension. Such a suspension may be formulated according to techniques known in the art using a suitable dispersing or wetting agent (e.g., Tween 80) and a suspension agent. The sterile injectable formulation may also be a sterile injectable solution or suspension in a nontoxic parenterally acceptable diluent or solvent (e.g., a solution in 1,3-butanediol). Available acceptable vehicles and solvents may include mannitol, water, Ringer's solution, and isotonic sodium chloride solutions. In addition, sterile nonvolatile oils may be commonly used as solvents or suspension media. For this purpose, any less irritating nonvolatile oil containing synthetic mono- or di-glycerides may also be used. Fatty acids such as oleic acid and glyceride derivatives thereof are useful for injectable preparations, like pharmaceutically acceptable natural oils (e.g., olive oil or castor oil), particularly polyoxyethylated forms thereof.

The pharmaceutical composition of the present invention may also be administered in the form of a suppository for rectal administration. Such a composition can be prepared by mixing the compound of the present invention with suitable non-irritating excipients which are solid at room temperature but liquid at a rectal temperature. Such materials include, but are not limited to, cocoa butter, beeswax, and polyethylene glycols.

The parenteral administration of the pharmaceutical composition according to the present invention is particularly useful, when the desired treatment relates to a site or organ that is easily accessible by topical application. When applied topically to the skin, the pharmaceutical composition should be formulated in a suitable ointment containing the active ingredient suspended or dissolved in a carrier. The carrier for topical administration of the compound of the present invention includes, but is not limited to, mineral oil, liquid paraffin, white Vaseline, propylene glycol, polyoxyethylene, polyoxypropylene compounds, emulsifying wax and water. Alternatively, the pharmaceutical composition may be formulated in a suitable lotion or cream containing the active compound suspended or dissolved in a carrier. The suitable carrier includes, but is not limited to, mineral oil, sorbitan monostearate, polysorbate 60, cetyl ester wax, cetearyl alcohol, 2-octyldodecanol, benzyl alcohol, and water. The pharmaceutical composition of the present invention can also be applied topically in the form of a rectal suppository or suitable enema to the lower intestine. Topically applied transdermal patches also fall within the scope of the present invention.

The pharmaceutical composition of the present invention can be administered as a nasal aerosol or through inhalation. Such a composition is prepared according to techniques well-known in the pharmaceutical field and is prepared as a solution in saline using benzyl alcohol or other suitable preservatives, absorption accelerators to enhance bioavailability, fluorocarbons and/or other solubilizers or dispersants known in the art.

The content of the active ingredient in the pharmaceutical composition of the present invention is not particularly limited, and may be 0.0001 to 50% by weight, more preferably 0.01 to 10% by weight, based on the total weight of the final composition.

EXAMPLES

Hereinafter, the present invention will be described in more detail with reference to examples. However, it will be obvious to those skilled in the art that these examples are provided only for illustration of the present invention, and should not be construed as limiting the scope of the present invention.

Example 1: Astrocyte Differentiation Medium $1 \times 10^5$ human neural stem cells (see Korean Patent No. 1816103) were prepared in a 60 mm dish and cultured in neurobasal medium containing DMEM/F12, N2, B27, bFGF, and EGF the next day. Then, the culture solution was changed every 2 to 3 days. On the 5th day, the cells were removed using Accutase and were seeded at $1 \times 10^6$ cells on a petri dish and suspension-cultured. At this time, the seeded neural stem cells agglomerate together, rather than being attached to the bottom of the plate, to form small spheres. Every 2 days, the medium was replaced with fresh medium, and after about 7 days, spheres were formed to a size that could be seen with the naked eye. The plate was first coated with PLO/FN and then the spheres were placed thereon.

The next day, the medium was replaced with a medium for differentiation into astrocytes. A medium further containing CNTF (5 ng/ml), bFGF (8 ng/ml), and BMP4 (10 ng/ml) in the basal medium containing DMEM/F12, N2, and B27 was used for 2 days, and a medium containing CNTF and BMP4, without bFGF, was used for the next 2 days. After the medium containing the cytokine combination was used for 4 days, the medium was replaced with a medium further containing 2% FBS (fetal bovine serum) in the basic medium containing DMEM/F12, N2, and B27. Then, morphological changes were observed while the medium was changed every 2 days.

Figure 1A:
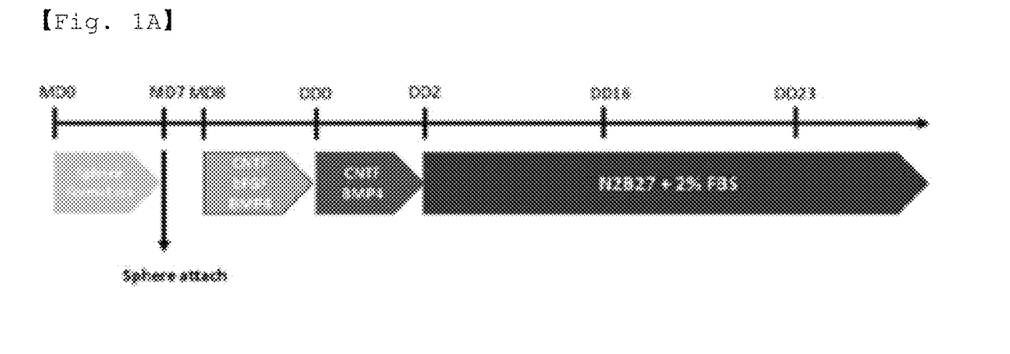
FIG. 1A shows a process of differentiating human neural stem cells into astrocytes based on cell conversion.

FIG. 1A shows a process of differentiating neural stem cells into astrocytes including preparing neural stem cells, culturing the cells in a 3D culture for 7 days, treating the cells with cytokines suitable for each stage for 4 days, and culturing the cells in fresh medium for facilitating the activity of astrocytes after the cytokines disappeared.

Example 2: Verification of Characterization of Differentiated Astrocytes

The neural stem cells were differentiated into astrocytes by the method using the differentiation medium of Example 1, and whether or not the differentiated astrocytes exhibited general characteristics was determined.

Figure 1B:
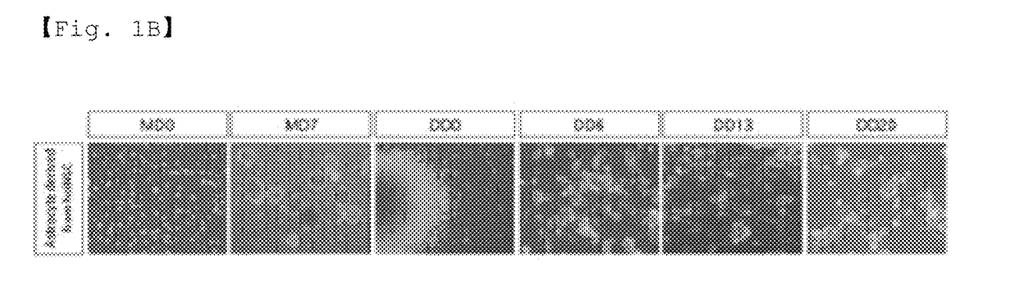
FIG. 1B shows morphological changes of cells that are differentiated from neural stem cells to astrocytes.

First, immunocytochemistry (ICC) was performed to determine whether or not astrocytes express astrocyte markers. The differentiated cells were fixed overnight in a refrigerator in 4% paraformaldehyde (PFA). The cells were washed twice with PBS buffer and then treated with 0.1% triton X-100 for 10 minutes to create an environment for effective staining (permeabilization step). After blocking with 10% NDS (normal donkey serum) for one hour, the primary antibody, GFAP antibody was diluted at 1:400 in 2% NDS in order to stain the cells, and the cells were treated with the resulting antibody at 4° C. for one day. The next day, the cells were reacted with a secondary antibody at room temperature for one hour, and the nuclei were stained with a DAPI staining reagent and then observed with a fluorescence microscope (FIG. 1B).

Figure 1C:
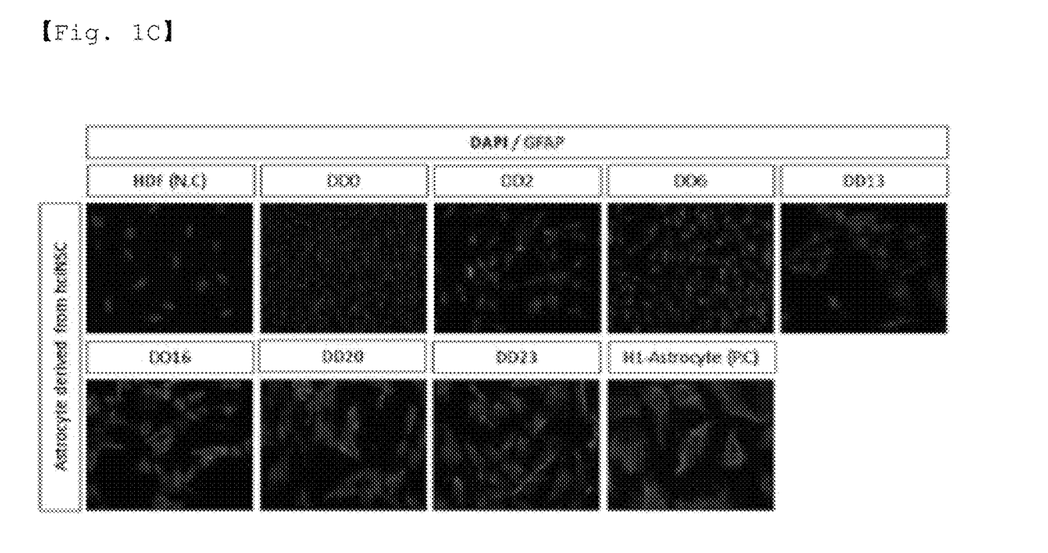
FIG. 1C is an image showing GFAP (glial fibrillary acidic protein), which is an astrocyte marker, detected for each differentiation cycle through immunocytochemistry (ICC).

As a result, it could be seen through immunocytochemistry (ICC) staining that astrocytes expressed GFAP (FIG. 1c). It could be seen that, as differentiation progressed, the GFAP signal, which was not clearly observed in neural stem cells, gradually became more clear.

Figure 1D:
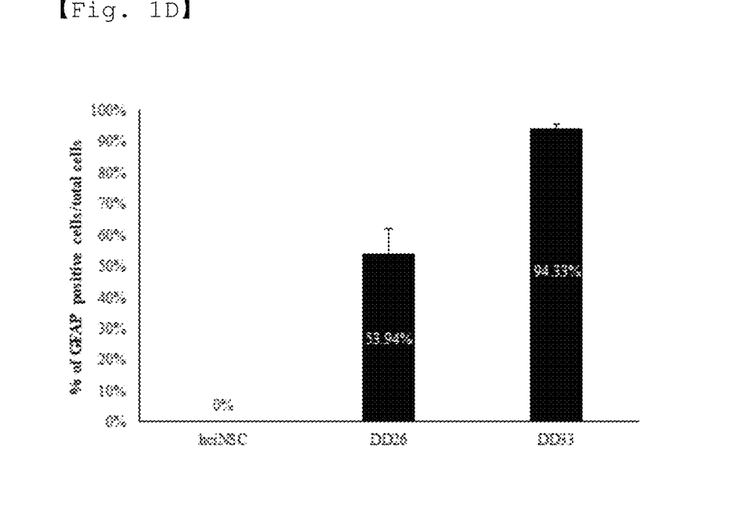
FIG. 1D is a graph showing a comparison of the differentiation efficiency of astrocytes calculated based on the result of ICC shown in FIG. 1C, with that of the control hciNSC (human chemical-induced neural stem cells).

In addition, the efficiency of differentiation of astrocytes could be measured based on the results of the immunocytochemistry (ICC) staining. Compared to the negative control hciNSC (human chemical-induced neural stem cell), the efficiency was 53.94% on the 26th day of differentiation (DD26), and greatly increased to 94.33% on the 33rd day (DD33) after the start of differentiation (FIG. 1D).

Figure 1E:
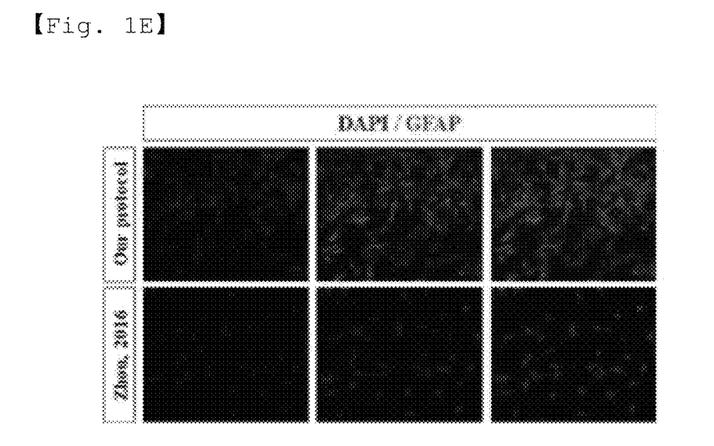
FIG. 1E is an image showing GFAP (glial fibrillary acidic protein), which is an astrocyte marker, detected through ICC (immunocytochemistry), after differentiation into astrocytes using a conventional differentiation method (Zhou et al., Stem cell international, 2016) and the method of differentiation into astrocytes according to the present invention.
Figure 1F:
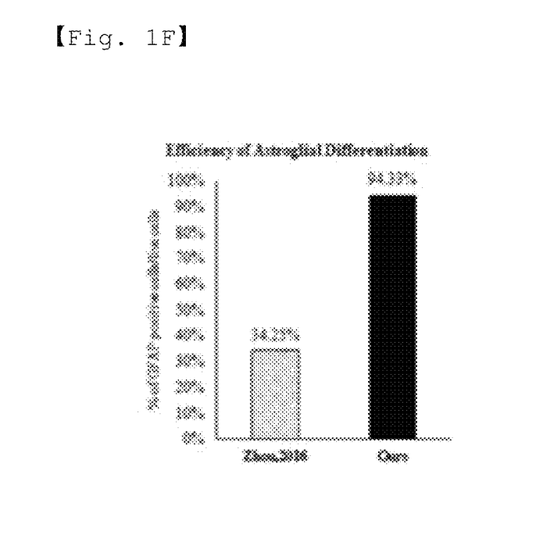
FIG. 1F shows the efficiency of astrocyte differentiation using the conventional differentiation method (Zhou et al., Stem cell international, 2016) and the differentiation method of the present invention.

Then, GFAP (glial fibrillary acidic protein), which is an astrocyte marker, was detected through ICC (immunocytochemistry) after differentiation into astrocytes using a conventional differentiation method (Zhou et al., Stem cell international, 2016) and the method of differentiation into astrocytes according to the present invention. The result showed that the GFAP signal was more strongly expressed in the cells differentiated in the differentiation medium of the present invention, but was very weakly expressed in the cells differentiated in the differentiation medium of the conventional method (FIG. 1E). In addition, when comparing the differentiation efficiency based on the results, it was found that the conventional method exhibited an efficiency of 34.25%, but the method using the differentiation medium of Example 1 exhibited a very high efficiency of 94.33% (FIG. 1F).

Figure 1G:
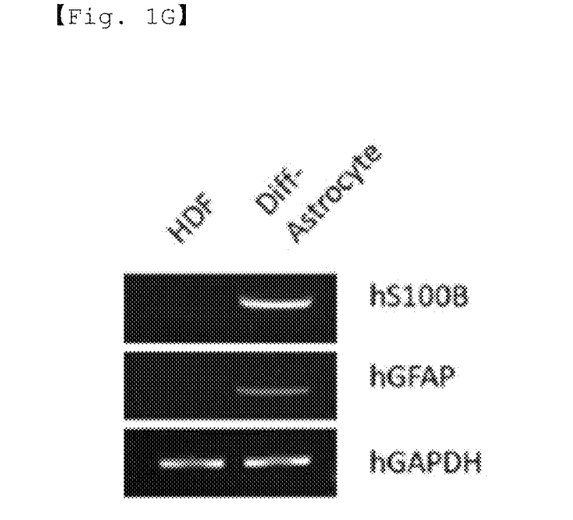
FIG. 1G shows astrocyte markers GFAP (glial fibrillary acidic protein) and S100β (S100 calcium-binding protein β) detected through PCR.
Figure 1H:
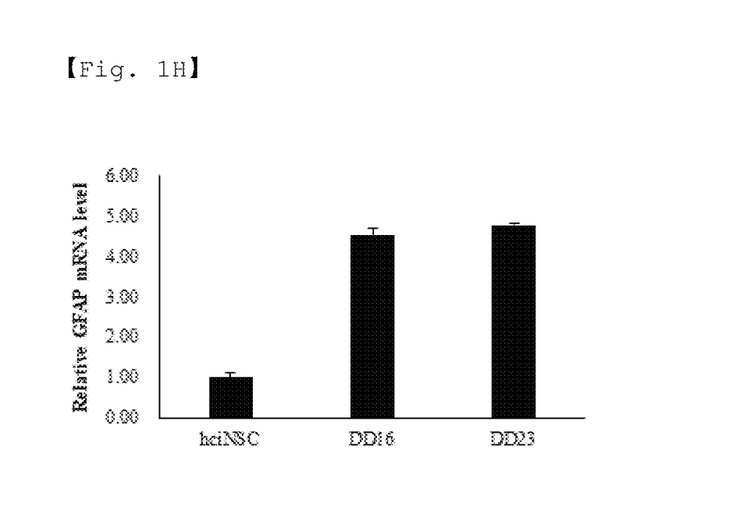
FIGS. 1H and 1I show the results of real-time qPCR showing that the astrocyte markers GFAP and S100β increase, as differentiation into astrocytes proceeds.
Figure 1I:
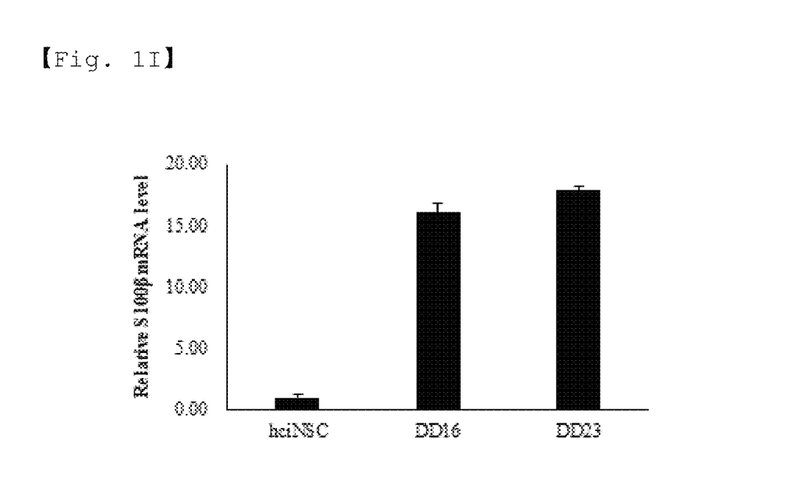

Finally, it can be seen through PCR and real-time qPCR that the gene expression of the astrocyte markers GFAP and S100β appeared in differentiated human astrocytes (FIG. 1G). GFAP and S100β were not observed in HDF (human dermal fibroblast), which is a negative control, but GFAP and S100β were observed in differentiated cells on DD33. In addition, it was observed that the gene expression of the astrocyte markers GFAP and S100β gradually increased at the mRNA level on D33 as differentiation proceeded (FIGS. 1H and 1I).

Example 3: Verification of Maturation of Differentiated Astrocytes

Astrocytes must mature in order to be capable of perform the main functions thereof, such as supporting maintenance of neuron functions. To verify this maturation, whether or not ion channels are located in the astrocyte membrane or whether or not glutamate uptake was properly performed was determined.

3-1: Detection of Ion Channel Markers

Figure 2A:
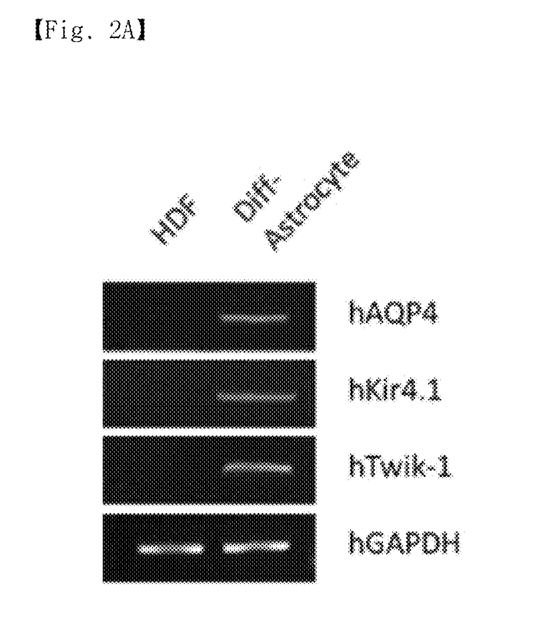
FIG. 2A shows the ion channel markers Aquaporin 4 (AQP4), Kir4.1 and Twik-1, present in astrocytes, detected through PCR.

The presence of ion channels in astrocytes is taken as a criterion for determining whether or not astrocytes are sufficiently mature to perform various functions. Thus, Aquaporin 4 (AQP4), Kir4.1 and Twik-1, which are ion channel markers present in astrocytes, were detected through PCR. The result showed that channels through which ions can be exchanged were formed in the differentiated astrocytes (FIG. 2A). AQP4, Kir4.1 and Twik-1 were not detected in the negative control HDF (human dermal fibroblast), but expression of AQP4, Kir4.1 and Twik-1 was detected in differentiated cells on DD33.

Figure 2B:
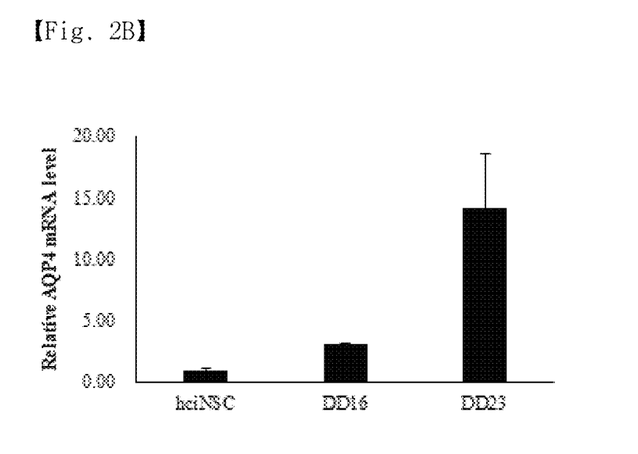
FIG. 2B shows the result of real-time qPCR showing that AQP4, an astrocyte ion channel marker, increases as differentiation into astrocytes proceeds.

In addition, it can be also seen through real-time qPCR that AQP4 increased as differentiation proceeded. In particular, the AQP4 mRNA level was remarkably increased on DD33 compared to on DD26 (FIG. 2B).

3-2: Glutamate Uptake

Astrocytes remove glutamate released by neurons to help maintain the function of neurons. At this time, whether or not astrocytes perform glutamate uptake properly can be determined by measuring the concentration of glutamate in the conditioned medium.

Figure 2C:
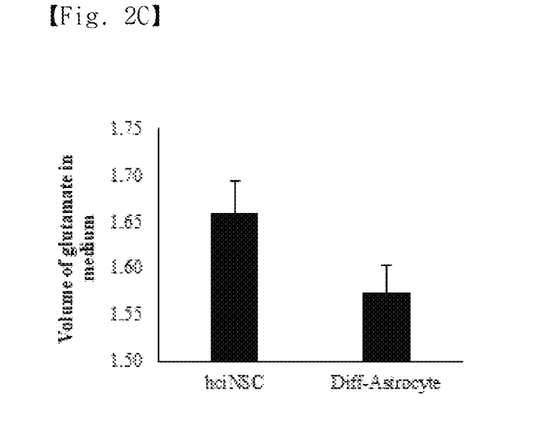
FIG. 2C is a graph showing a glutamate uptake, which is a maturation index of astrocytes, detected by measuring a glutamate concentration of a conditioned medium.

The concentration of glutamate was measured using the glutamate assay kit (Abcam), and the amount of glutamate in differentiated astrocytes was found to decrease compared to the negative control hciNSC (FIG. 2C). Therefore, it can be seen that the astrocytes differentiated by the method using the differentiation medium of Example 1 were sufficiently mature to properly perform glutamate uptake.

The differentiation of human neural stem cells into human astrocytes and maturation thereof into functional astrocytes are highly potentially useful for cell therapy for the treatment of degenerative brain diseases in humans, and are potentially useful as optimal model cells for the study of astrocyte development and mechanisms of the pathogenesis of brain diseases.

Example 4: Suppression of Immune Response of Differentiated Astrocytes

It is known that when the brain is damaged, astrocytes are activated and function as immune cells. In order to determine whether or not the differentiated astrocytes have such a function of inhibiting inflammatory response, the expression of TNF-α (tumor necrosis factor alpha), which is a factor inducing inflammation, was detected through real-time qPCR.

Figure 3A:
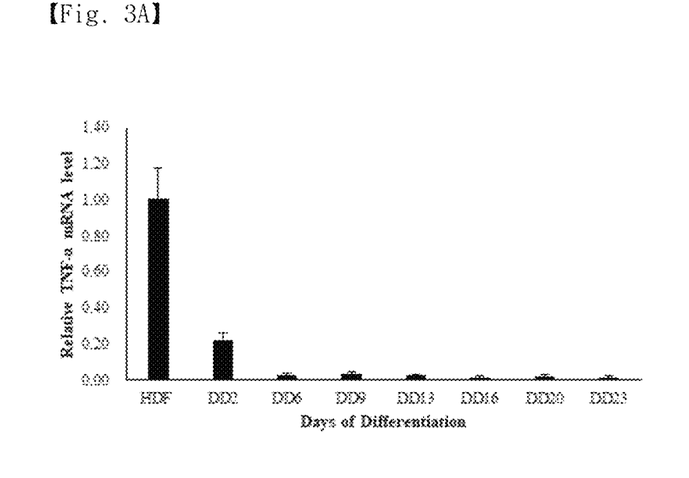
FIG. 3A is a graph showing TNF-α (tumor necrosis factor alpha), which is a factor causing inflammation, detected by real-time qPCR.

The result showed that TNF-α content, an indicator of severity of inflammation, which was high in the undifferentiated human dermal fibroblast negative control, decreased as differentiation into astrocytes proceeded, which indicates that the differentiated astrocytes have a function of inhibiting the inflammatory response (FIG. 3A).

In addition, it was found that the inflammatory response was alleviated by treating inflammation-induced cells (diseased cells) with the culture medium (conditioned medium) collected during differentiation of human neural stem cells into astrocytes.

Figure 3B:
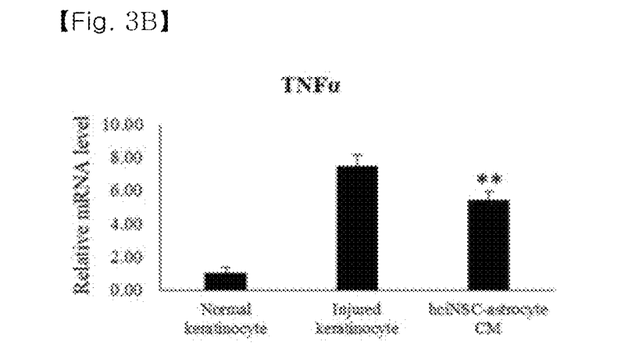
FIG. 3B is a graph showing the expression of TNF-α, a pro-inflammatory cytokine, detected using real-time qPCR, and shows that the expression of TNF-α is reduced upon treatment of inflammation-induced keratinocytes with an astrocyte-conditioned culture medium.
Figure 3C:
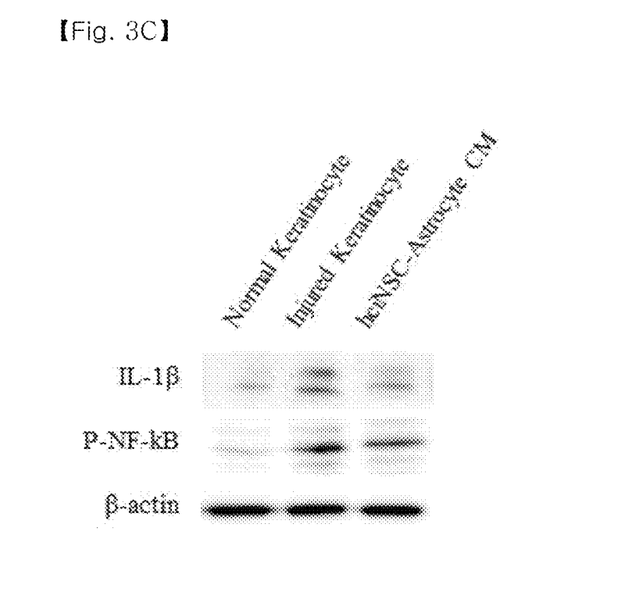
FIG. 3C shows IL-1β, which is a pro-inflammatory cytokine, and p-NF-kB, which regulates induction thereof, detected using Western blot, and shows that the expression of IL-1β and p-NF-kB decreases after treatment of inflammation-induced keratinocytes with the astrocyte-conditioned culture medium.
Figure 3D:
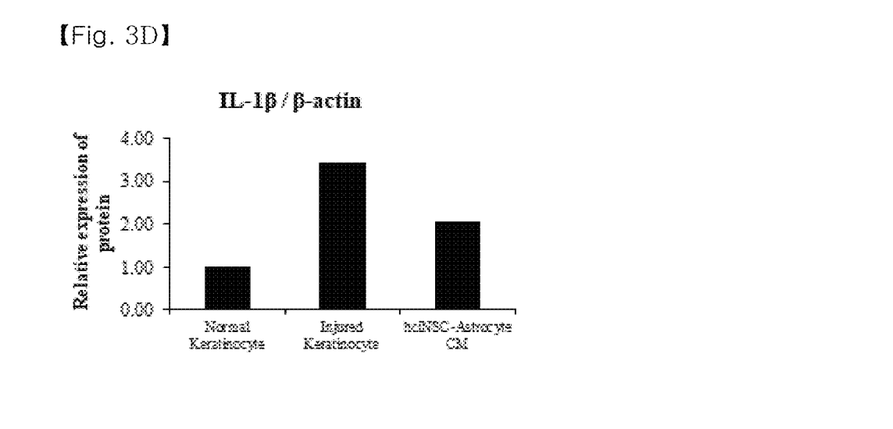
FIG. 3D is a graph quantitatively showing the result of western blot of IL-1β detected in FIG. 3C.
Figure 3E:
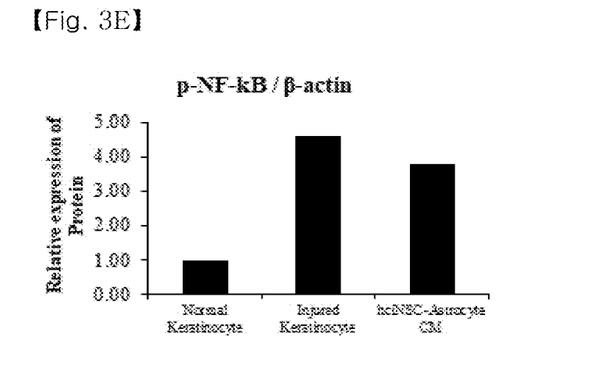
FIG. 3E is a graph quantitatively showing the result of Western blot of p-NF-kB detected in FIG. 3C.

First, experiments were conducted on human keratinocytes. Keratinocytes secrete cytokines that induce an inflammatory response, and function to regulate the inflammatory response. Human keratinocytes (ATCC, United States) were treated with human neural stem cell-derived astrocyte culture medium (differentiated for 23 days) for one day. The next day, the expression of TNF-α in the cells treated with INF-γ (interferon gamma-100 ng/ml) and TNF-α (100 ng/ml), which are inflammation-inducing factors, for one hour, was observed, and cells treated with the culture medium was found to exhibit decreased expression of TNF-α compared to the inflammation-induced cells (FIG. 3b). In addition, it could be seen through Western blot that the pro-inflammatory cytokine IL-1β (interleukin-1β) and p-NF-kB (phospho-nuclear factor-kappaB), which regulates the same, were decreased in the culture medium-treated cell group (FIGS. 3C, 3D and 3E).

Figure 3F:
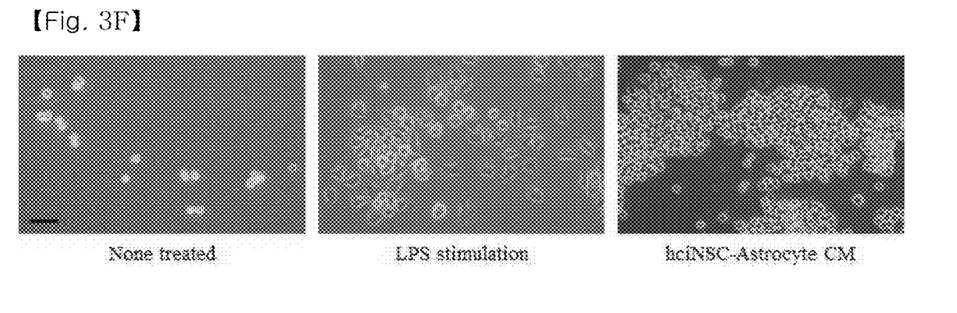
FIG. 3F is an image showing a change in cell morphology when treating macrophages, which are cells responsible for immunity, with a human neural stem cell-derived astrocyte culture medium, and then treating the same with an inflammatory factor (LPS). The cells are activated in the group treated only with LPS, whereas the cells have a morphology similar to that of normal cells in the group treated with the culture medium.

In addition, the same experiment was carried out on macrophages (Korea Cell Line Bank), which are cells responsible for immunity. The macrophages were treated with human neural stem cell-derived astrocyte culture medium (differentiated for 23 days) for one day, and were then treated with LPS (Lipopolysaccharide-50 ng/ml), which is a substance causing an immune response, for one hour. Changes in the morphology of the cells were observed with a microscope, and the result showed that the cells were activated in the group treated only with LPS, but the cells had a morphology similar to that of normal cells in the group treated with the culture medium (FIG. 3F).

Figure 3G:
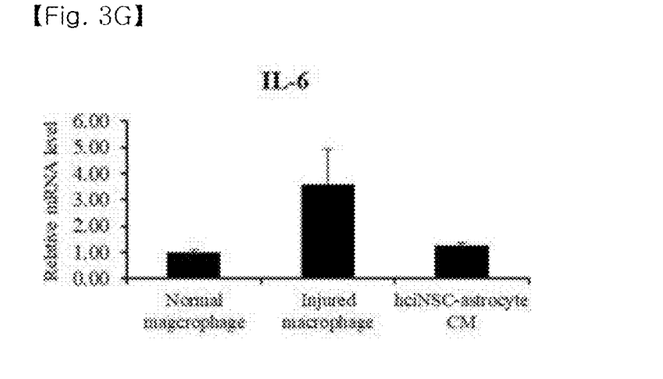
FIG. 3G is a graph showing the expression of IL-6, a pro-inflammatory cytokine, detected using real-time qPCR, wherein macrophages treated with the astrocyte culture medium exhibits lower IL-6 expression than cells not treated therewith.
Figure 3H:
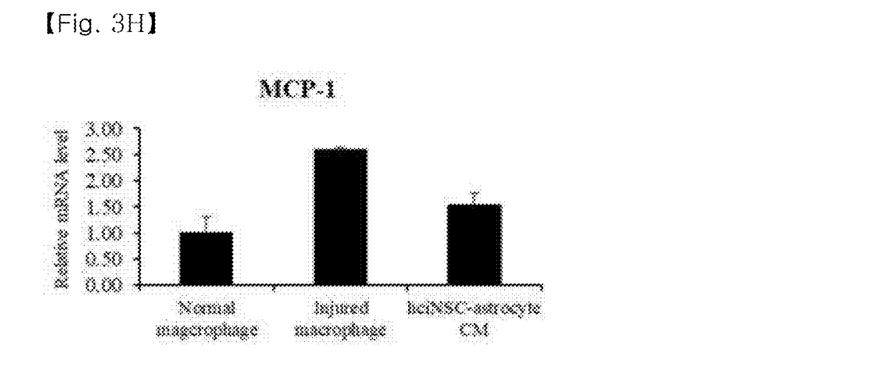
FIG. 3H is an image showing the expression of MCP-1, a pro-inflammatory chemokine, detected using real-time qPCR, wherein the group of inflammation-induced cells treated with the astrocyte culture medium exhibits lower MCP-1 expression compared to the group of cells not treated with the culture medium.
Figure 3I:
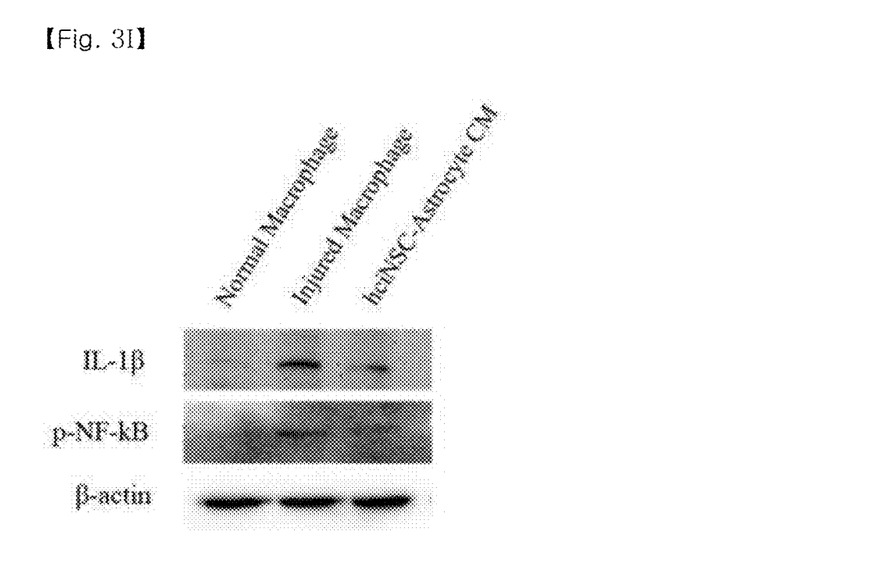
FIG. 3I shows IL-1β, which is a pro-inflammatory cytokine, and p-NF-kB, which is a factor regulating induction thereof, detected using Western blot, and shows that the expression of IL-1β and p-NF-kB decreases after treatment of inflammation-induced macrophages with the astrocyte culture medium.
Figure 3J:
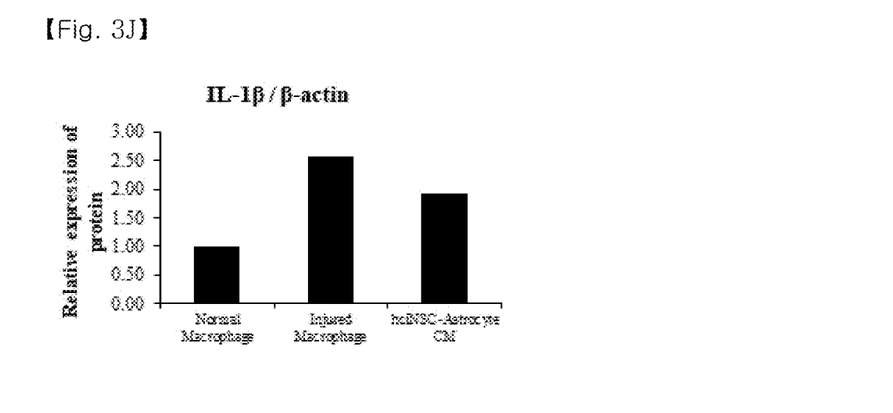
FIG. 3J is a graph quantitatively showing the result of western blot of IL-1β detected as shown in FIG. 3I.
Figure 3K:
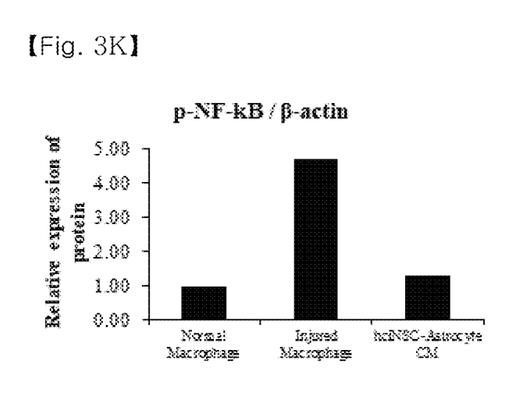
FIG. 3K is a graph quantitatively showing the result of Western blot of p-NF-kB detected as shown in FIG. 3I.

The result of real-time qPCR showed that IL-6 (interleukin-6) expression decreased in the culture medium-treated cell group, and expression of the pro-inflammatory chemokine of MCP-1 (monocyte chemotactic protein-1) also decreased therein (FIGS. 3G and 3H). In addition, the result of Western blot showed that IL-1β, a pro-inflammatory cytokine, and p-NF-kB, regulating the same, decreased in the culture medium-treated cell group (FIG. 3I). This result indicates that the human neural stem cell-derived astrocyte culture medium functions to alleviate the inflammatory response in inflammation-induced cells and that differentiated astrocytes act as anti-inflammatory cells.

INDUSTRIAL APPLICABILITY

The method of differentiating neural stem cells into astrocytes using a differentiation medium containing a combination of several cytokines according to the present invention enables the differentiation time to be shortened and excellent differentiation efficiency to be obtained, unlike conventional methods, and the differentiated astrocytes exhibit an immune response suppression ability and thus are useful as a therapeutic agent for various brain diseases such as degenerative neurological diseases.

Although specific configurations of the present invention have been described in detail, those skilled in the art will appreciate that this description is provided to set forth preferred embodiments for illustrative purposes and should not be construed as limiting the scope of the present invention. Therefore, the substantial scope of the present invention is defined by the accompanying claims and equivalents thereto.

The invention claimed is:

1. A method for differentiating neural stem cells into astrocytes comprising:
    (a) primarily culturing neural stem cells for only 2 days in a differentiation medium containing ciliary neurotrophic factor (CNTF), basic fibroblast growth factor (bFGF), and bone morphogenetic protein 4 (BMP4);
    (b) secondarily culturing the primarily cultured cells for only 2 days in a differentiation medium not containing bFGF, but containing CNTF and BMP4; and
    (c) tertiarily culturing the secondarily cultured cells in a differentiation medium not containing CNTF, bFGF and BMP4, but containing fetal bovine serum (FBS); thereby producing astrocytes.

2. The method according to claim 1, wherein the differentiation medium in each of steps (a), (b) and (c) comprises Dulbecco's Modified Eagle Medium/Nutrient Mixture F-12 (DMEM/F12) containing N2.

3. The method according to claim 1, wherein the culture in step (c) is performed for 21 to 35 days.

4. The method according to claim 1, wherein the FBS is 1.5% to 4.5% (v/v).

5. The method according to claim 1, wherein the neural stem cells are in a form of spheres.

6. The method according to claim 5, wherein the neural stem cells are obtained by followings:
    sub-culturing the neural stem cells in a medium including DMEM/F12 containing N2, bFGF, and epidermal growth factor (EGF) and forming the spheres by suspension culture.

7. The method according to claim 6, wherein the formation of the spheres is performed for 4 to 9 days.

8. The method according to claim 1, wherein the astrocytes express a glial fibrillary acidic protein (GFAP) or S100 calcium-binding protein β (S100β) marker.

9. The method according to claim 1, wherein the astrocytes express an Aquaporin 4 (AQP4), Kir4.1 or Twik-1 marker.

10. The method according to claim 1, wherein the astrocytes perform glutamate uptake.

11. The method according to claim 1, wherein the astrocytes exhibit reduced tumor necrosis factor-α (TNF-α) expression compared to the neural stem cells.

12. A composition for preventing, alleviating or treating inflammatory diseases, comprising a culture medium obtained by the method of differentiating neural stem cells into astrocytes according to claim 1, as an active ingredient.

13. The composition of claim 12, wherein the culture medium is a conditioned medium from which the cells have been removed.

14. The composition of claim 12, wherein the culture medium is obtained by performing step (c) for 21 to 35 days.

* * * * *